US012494105B2

(12) United States Patent
Rodgers et al.

(10) Patent No.: US 12,494,105 B2
(45) Date of Patent: Dec. 9, 2025

(54) LINKAGE MECHANISM FOR A DOOR IN A GAMING CABINET AND GAMING CABINET HAVING A DOOR WITH A LINKAGE MECHANISM

(71) Applicant: AGS LLC, Las Vegas, NV (US)

(72) Inventors: Matthew T. Rodgers, Las Vegas, NV (US); Kevin Green, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 257 days.

(21) Appl. No.: 18/481,382

(22) Filed: Oct. 5, 2023

(65) Prior Publication Data

US 2025/0118143 A1 Apr. 10, 2025

(51) Int. Cl.
*G07F 17/32* (2006.01)
*G07F 17/34* (2006.01)

(52) U.S. Cl.
CPC .......... *G07F 17/3216* (2013.01); *G07F 17/34* (2013.01)

(58) Field of Classification Search
CPC ............................ G07F 17/3216; G07F 17/34
USPC ............................................................ 463/46
See application file for complete search history.

(56) References Cited

U.S. PATENT DOCUMENTS 5,515,959 A * 5/1996 Stephenson, III .... E05D 7/1066 194/350
2008/0113709 A1* 5/2008 Beadell .................. G07F 17/32 463/16
2021/0209893 A1* 7/2021 Rye ..................... G07F 17/3241

* cited by examiner

*Primary Examiner* — Ryan Hsu
(74) *Attorney, Agent, or Firm* — Endurance Law Group PLC; James R. Yee

(57) ABSTRACT

A gaming machine cabinet for a mechanical reel based gaming machine is provided. A plurality of reel devices, each including a mechanical reel and a basket, provides fast and easy installation of the mechanical reels in the gaming machine cabinet. The reel devices are mounted to a self-adjusting sled. The gaming machine cabinet includes a belly door that is coupled to the gaming machine cabinet and provides closed, intermediate, and fully open positions for the belly door.

12 Claims, 16 Drawing Sheets

LINKAGE MECHANISM FOR A DOOR IN A GAMING CABINET AND GAMING CABINET HAVING A DOOR WITH A LINKAGE MECHANISM

FIELD OF THE INVENTION

The invention relates generally to gaming machines, and more particularly to a gaming machine cabinet.

BACKGROUND OF THE INVENTION

Wager-based gaming machines have become increasingly complex. Originally, mechanical slot machines had metal cabinets which housed a plurality of spinning physical reels which displayed game symbols. The symbols were viewable through windows in a front of the gaming machine.

Gaming machines continue to evolve, both relative to their method of manufacture and their aesthetic appearance. For example, gaming machines are often modular now and may include a main unit with an upper unit. The main unit may include the components necessary for operation of the gaming machine, including, for example, but not limited to a controller and user input devices. Some of the components may be located within an internal cavity of the main unit. The internal cavity is accessible, for example, for performing maintenance of the gaming machine, via lockable door that opens to provide access. This door may be referred to as the "belly" door. The belly door may be provided with a hinge on a lower edge such that the belly door opens from the top edge and opens outward and downward relative to the gaming cabinet. However, the belly door, including any gaming machine components connected thereto, may be relatively heavy, making it difficult or cumbersome to safely open to provide maintenance. Some prior art cabinets may include a gas cylinder to reduce the force necessary to open and/or close the belly door. However, the belly door may remain heavy and cumbersome to open and close.

Other issues remain with sophisticated gaming machines that use mechanical reels. Although the mechanical reels are mechanical, mechanical reels are generally controlled electronically, may be backlit, and have other features, which require the use of electronics mounted adjacent the mechanical reels. Some reel devices may be preassembled and then installed within the gaming machine cabinet. Generally, these reel devices are simply mounted to a framing member within the gaming machine cabinet using predrilled or preformed holes and appropriate fasteners. Due to the location of the preformed holes and the location of the reel devices within the cabinet, the installation process may be difficult and time consuming.

Additionally, mechanical reel slot machines may be equipped with a variable number of mechanical reel devices. The mechanical reel devices may be located within an internal cavity of the gaming machine cabinet and may be viewable by a player through one or more windows in the gaming machine cabinet. Each mechanical reel devices may be preassembled individually and mounted separately inside the gaming machine cabinet. It is desirable that each mechanical reel appear, to the player, to be the same difference from the window(s). However, due to manufacturing tolerances, in the components of the mechanical reel devices and the mounting components, the mechanical reels of the mechanical reel devices may be appear to be different distances from the window or windows.

The present invention is aimed at one or more of the problems identified above.

BRIEF SUMMARY OF THE INVENTION

In a first aspect of the present invention, a linkage mechanism for a door in a gaming machine cabinet is provided. The gaming machine cabinet has a floor member. A lower edge of the door being rotatably coupled to the floor member by a hinge. The linkage mechanism includes an upright frame member, a bracket, an arm and a pin. The upright frame member is mounted to the floor member and extends therefrom. The bracket rotatably is coupled to the upright frame member and has a slot. The slot includes first and second guiding portions forming a locking portion at a junction between the first and second guiding portions. The arm has a first arm end and second arm end. The first arm end is rotatably coupled to the bracket. The second arm end is rotatably coupled to a rear of the door. The linking member has a first linking member end and a second linking member end. The first linking member end is rotatably coupled to the arm. The linking member is moveable between a locked position and an unlocked position. The pin is fastened to the second linking member end and is slidably located within the slot of the bracket. The linkage mechanism is configured to allow the door to be moved between a closed position and an intermediate position. The pin located at one end of the first guiding portions when the door in is the closed position. The pin moves within the first guiding portion of the slot towards the locking portion as the door is moved from the closed position towards the intermediate position/The pin is positioned within the locking portion of the slot thereby preventing movement of the door when the door is in the intermediate position and the linking member is in the locked position.

In a second aspect of the present invention, a door assembly for a gaming machine cabinet having a floor member is provided. The door assembly includes a door and a linkage mechanism. The door has a lower edge rotatably coupled to the floor member by a hinge. The linkage mechanism includes an upright frame member, a bracket, an arm and a pin. The upright frame member is mounted to the floor member and extends therefrom. The bracket rotatably is coupled to the upright frame member and has a slot. The slot includes first and second guiding portions forming a locking portion at a junction between the first and second guiding portions. The arm has a first arm end and second arm end. The first arm end is rotatably coupled to the bracket. The second arm end is rotatably coupled to a rear of the door. The linking member has a first linking member end and a second linking member end. The first linking member end is rotatably coupled to the arm. The linking member is moveable between a locked position and an unlocked position. The pin is fastened to the second linking member end and is slidably located within the slot of the bracket. The linkage mechanism is configured to allow the door to be moved between a closed position and an intermediate position. The pin located at one end of the first guiding portions when the door in is the closed position. The pin moves within the first guiding portion of the slot towards the locking portion as the door is moved from the closed position towards the intermediate position/The pin is positioned within the locking portion of the slot thereby preventing movement of the door when the door is in the intermediate position and the linking member is in the locked position.

In a third aspect of the present invention, a gaming machine cabinet is provided. The gaming machine cabinet has a frame with a floor member, a door, and a linkage mechanism. The door has a lower edge rotatably coupled to the floor member by a hinge. The linkage mechanism includes an upright frame member, a bracket, an arm and a pin. The upright frame member is mounted to the floor member and extends therefrom. The bracket rotatably is coupled to the upright frame member and has a slot. The slot includes first and second guiding portions forming a locking portion at junction between the first and second guiding portions. The arm has a first arm end and second arm end. The first arm end is rotatably coupled to the bracket. The second arm end is rotatably coupled to a rear of the door. The linking member has a first linking member end and a second linking member end. The first linking member end is rotatably coupled to the arm. The linking member is moveable between a locked position and an unlocked position. The pin is fastened to the second linking member end and is slidably located within the slot of the bracket. The linkage mechanism is configured to allow the door to be moved between a closed position and an intermediate position. The pin located at one end of the first guiding portions when the door in is the closed position. The pin moves within the first guiding portion of the slot towards the locking portion as the door is moved from the closed position towards the intermediate position/The pin is positioned within the locking portion of the slot thereby preventing movement of the door when the door is in the intermediate position and the linking member is in the locked position.

BRIEF DESCRIPTION OF THE SEVERAL VIEWS OF THE DRAWINGS

These and other features and advantages of the present invention will become more readily appreciated when considered in connection with the following detailed description and appended drawings.

DETAILED DESCRIPTION OF THE INVENTION

With reference to the figures, and in operation, the present invention provides a gaming machine 10 having a gaming machine cabinet 12. In the illustrated embodiment, the gaming machine 10 is a mechanical reel gaming machine that includes a plurality of mechanical reels (see below) that are utilized in providing one or more base and/or bonus games to a player. The gaming machine cabinet 12 generally includes a frame 14 which may be comprised of different framing members and/or may be partially comprised of other components of the gaming machine 10. In general, the term "frame" may refer to components of the gaming machine cabinet 12 to which other components are fastened, mounted, or otherwise connected thereto.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The principles of the invention may be applied to gaming machines having various configurations. The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
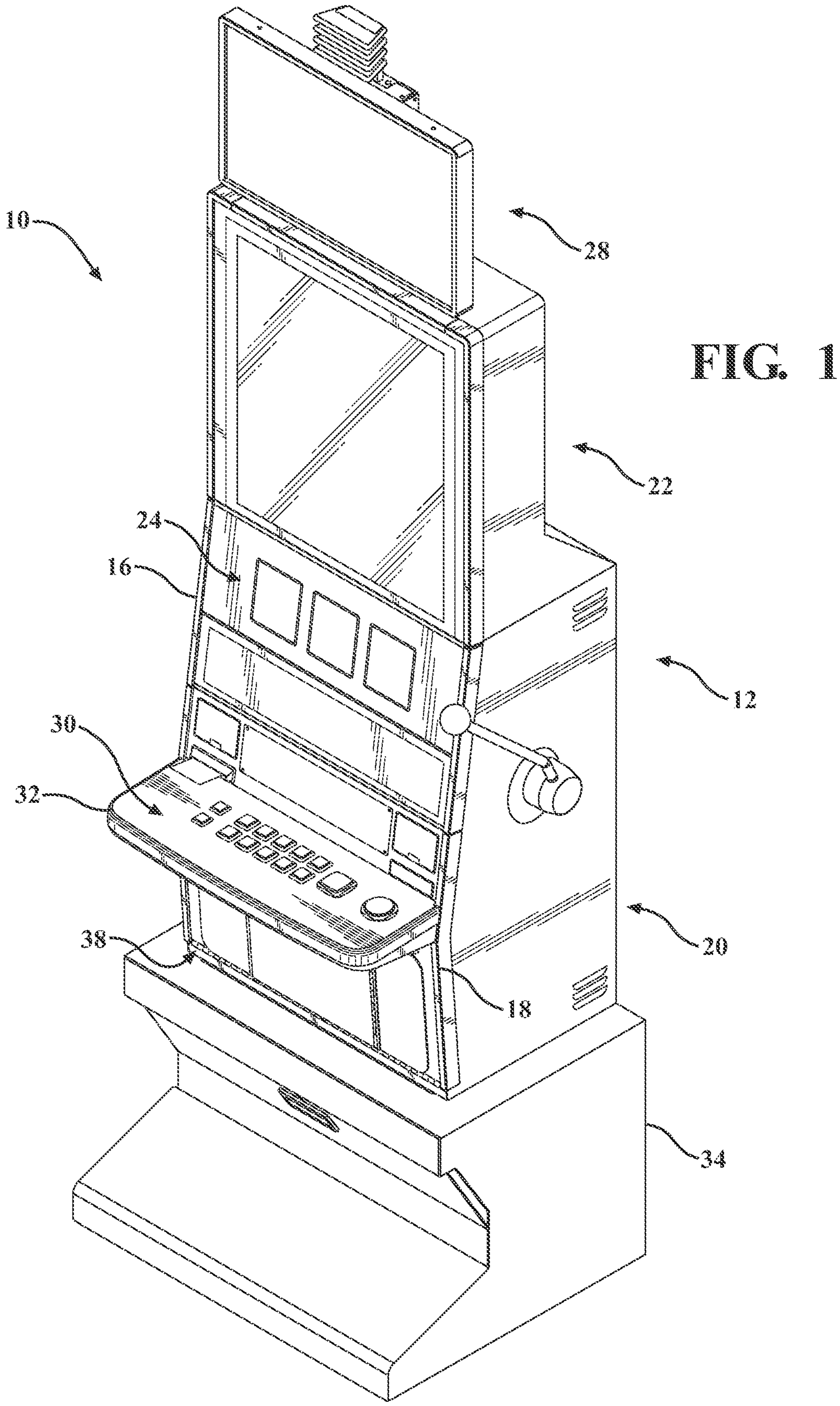
FIG. 1 is a perspective view of a gaming machine cabinet having a main unit and an upper unit, according to an embodiment of the present invention.

One configuration of a gaming machine 10 to which aspects of the invention may be applied is illustrated in FIG. 1. As illustrated, the gaming machine 10 generally includes the gaming machine cabinet (or housing) 12 for supporting and/or enclosing various components required for operation of the gaming machine. The gaming machine cabinet 12 may include one or more doors 16, 18 or other access panels or features which can be moved between an open position which allows access to one or more interior portions of the gaming machine, and a closed position in which access to the one or more interior portions is generally prevented. The doors 14, 16 may include locks or other features for securing them in their closed positions. The configuration of the gaming machine 12 may vary, such as having other shapes or dimensions.

With reference to FIG. 1, the illustrated gaming machine cabinet 12 includes a main or main unit 2 and an upper unit 24. Generally, in the illustrated embodiment, the main unit 22 houses all of the components of the gaming machine 10, including a reel assembly 50 that includes a plurality of mechanical reels (see below). The front of the main unit may include a window or windows through which the player may view the mechanical reels. In the illustrated embodiment, the gaming machine 10 includes three mechanical reels. The gaming machine cabinet 12 may include a single window 24 through which all the reels are viewable or a separate window 24 associated with each reel. Furthermore, in the illustrated embodiment, the gaming machine 10 includes three mechanical reels, but any number of reels, e.g., 5 or 6, may be included.

In the illustrated embodiment, the upper door 16 provides access to the cavity in which the reel assembly 50 is located and the belly door 18 provides access to a lower cavity in the main unit 20.

The upper unit 22 may house a display device to display game information. The display device 26 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED), and organic light emitting display (OLED), or other suitable displays now known or later developed, in a variety of resolutions, sizes and formats. The display device 26 may be capable of projecting or displaying a wide variety of information, including images, symbols and other indicia or information associated with game play, game promotion or other events.

The gaming machine 10 might also include a topper 28. Such a topper 28 might include one or more display devices for displaying other game related information.

In general, the gaming machine 22 may be configured to present one or more games upon a player making a monetary payment or wager. In this regard, the gaming machine 10 includes a mechanism or means for accepting monetary value, such as a bill validator or a ticket reader.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. The gaming machine 10 may include a mechanism or means for returning unused monetary funds and/or dispensing winnings to a player.

The gaming machine 10 preferably includes one or more player input devices 30 (such as input buttons, plunger mechanisms, a touch-screen display, joystick, touch-pad or the like). These one or more input devices 30 may be utilized by the player to facilitate game play, such as by providing input or instruction to the gaming machine 10. For example, such input devices 30 may be utilized by a player to place a wager, cause the gaming machine 10 to initiate a game, to "cash out" of the gaming machine, or to provide various other inputs. As illustrated, a button deck 32 may extend outwardly from the front of the gaming machine cabinet 12 towards the player. The button deck 32 may support, for example, one or more of the input devices 30, such as buttons, a touch screen or the like.

In one embodiment, the gaming machine 10 includes at least one microprocessor or controller for controlling the gaming machine, including receiving player input and sending output signals for controlling the various components or peripheral devices of the machine 10 (such as generating game information for display by the displays 26 and controller the mechanical reels). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for determining winning or losing game outcomes and controlling motion or rotation of the mechanical reels, as well as the stopping of the reels at respective reel stop positions to display the winning and losing game outcomes.

In general, the controller may be configured to execute machine readable code or "software" or otherwise process information, such as obtained from a remote server. Software or other instructions may be stored at a memory or data storage device, e.g., in a fixed or non-transitory configuration. The memory may also store other information or data, such as data stored in table(s) or other forms (including, but not limited to look-up tables, pay tables and other information, including tracked game play information). The gaming machine 10 may also include one or more random number generators for generating random numbers (such as implemented by a random number generator software module stored in the memory and executable by the processor or controller), such as for use in selecting game information and presenting the game in a random fashion (e.g. whereby the game is presented in a manner in which the player cannot control the outcome) or non-random fashion (e.g. such as where the game includes a skill component which can affect the outcome of the game).

The controller may be configured to execute machine readable code or instructions (e.g., software) which are configured to implement the game. In this regard, the gaming machine is specially configured to present the game via specific software and/or hardware which causes the gaming machine to operate uniquely. For example, the controller of the gaming machine 22 may be configured to detect a wager, such as a signal from a player's depressing of the "bet one" button (such as one of the buttons 30). Upon such an event and/or the player otherwise signaling the gaming machine to present the game, the controller may be configured to cause the mechanical reels to display game-related information, such as the outcome of a play of a game as a set of game symbols. The controller may accept input from a player of game inputs, such as a request to spin reels or the like, via the one or more player input devices of the gaming machine 10. As indicated above, the machine-readable code may be configured in various manners, such as by having various "modules" of software which are designed to implement specific features of the game play or game presentation.

The gaming machine 10 may be configured to generate and present games in a stand-alone manner or it may be in communication with one or more external devices at one or more times. For example, the gaming machine 10 may be configured as a server based device and obtain game code or game outcome information from a remote game server (in which event the gaming machine controller may receive game information from the server, such as game outcome information, and use that server-generated information to present the game at the gaming machine). For example, the gaming machine 10 might be configured as a stand-alone device or as a server-based device for presenting games as Class III games (as defined by the U.S. Indian Gaming Regulatory Act) or as a server-based device for presenting games as Class II games (as defined by the U.S. Indian Gaming Regulatory Act).

As indicated, the gaming machine 10 is configured to present one or more wagering games. The gaming machine 10 may be configured to accept value, such as in the form of coins, tokens, paper currency, physical indicia of value, or other elements or devices representing value such as monetary funds. Thus, as indicated above, the gaming machine 10 preferably includes a mechanism or means for accepting monetary value. For example, while not shown in FIG. 1, the gaming machine 10 might include a coin acceptor for accepting coins. Of course, associated coin reading/verifying devices and coin storage devices may be associated with the gaming machine 10 if it is configured to accept coins. Likewise, the gaming machine 10 might include a currency accepting device (not visible) having an acceptor slot or opening which is accessible through an access opening, such as in the front of the cabinet just above the button deck 32. As also described below, such a device may be configured to accept and read/verify paper currency and/or other media such as tickets (although the currency accepting device may be configured to accept and read not only currency, but tickets, media or elements other than currency, for ease of reference the device is referred to herein as a currency accepting device).

The gaming machine 10 might also be configured to read devices, such as magnetic stripe cards or other media having data associated therewith and via which value or funds may be associated with the gaming machine 10. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications links, such as to enable the transfer of funds from the player to the gaming machine or system).

In use, the gaming machine 10 may position on top of a base or pedestal 34 (which is not part of the gaming machine cabinet 12).

When the player associates funds with the gaming machine 10 or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 10 may be configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 10 to indicate their desire to cash out, such as by selecting a "cash out" button (such as implemented via one of the buttons 30) or touch screen feature or providing other input. In response, a monetary value represented by the player's credit balance, or the like is preferably paid, transferred or otherwise provided to the player. For example, upon an award or at cash-out, associated funds may be paid to the player by the gaming machine 10 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In other embodiments, the cash-out mechanism may result in the funds value being transferred to an external device or account, such as a player's casino account (such as associated with a casino server), a remote bank or other financial account, or an electronic device such as a player's phone, PDA, or tablet.

The gaming machine 10 may also include a player tracking device, such as a card reader and associated keypad. Such player tracking devices are well known and may permit the game operator to track play of players of the gaming machine. The tracked play may be utilized to offer player bonuses or awards.

A casino or gaming property may have numerous such gaming machines 10, such as located on a casino floor or in other locations. Of course, such gaming machines 10 might be used in other environments, such as an airport, a bar or tavern or other locations.

It will be appreciated that the gaming machine illustrated in FIG. 1 is only exemplary of one embodiment of a gaming machine. For example, it is possible for the gaming machine to have various other configurations, including different shapes and styles and having different components than as just described.

As noted, the gaming machine 10 may, as noted above, be part of a system which includes other devices. For example, the gaming machine 10 may communicate with one or more casino systems, such as a player tracking server or system, an accounting system or server, a ticketing system, a bonusing system, a tournament system, other gaming machines, and external devices.

Reel Mounting Assembly

With reference to FIGS. 2-11, in one aspect of the present invention the gaming machine 10 includes a reel assembly 50. The reel assembly 50 includes a plurality of reel devices 52. Each reel device 52 includes a mechanical reel 54 and a basket 60. Each basket 60 is configured to receive the respective mechanical reel 54 and to provide fast and easy mounting of the reel devices 54 to a reel mounting member 56 which is mounted to the gaming machine cabinet frame 14 within the gaming machine cabinet 12.

In other aspects of the present invention, the reel mounting member 56 may be an adjustable sled 58. The position of the adjustable sled 58 is self-adjustable (see below) relative to the gaming machine cabinet frame 14 such that the position of the mechanical reels 54 relative to the window(s) 24 is consistent. It should be noted that the illustrated embodiment includes both the basket 60 and the adjustable sled 58, although the basket 60 and the adjustable sled 58 may be used independently of the other.

Basket

With reference to FIGS. 2-7, in one aspect of the present invention, an embodiment of a reel assembly 50 is shown. As referenced above, the reel assembly 50 includes a plurality of reel devices 52. Each reel device 52 includes a mechanical reel 54 and a respective basket 60. The reel device 52 may be mounted to a reel mounting member 56. The reel mounting member 56 may be a fixed component of the frame 14 of the gaming machine cabinet 12 or may be connected to an adjustable sled 58 that is adjustably coupled to a fixed reel mounting member 70 of the frame 12.

With specific reference to FIGS. 2-5, each reel device 52 includes a mechanical reel 54 and a basket 60. In the illustrated embodiment, each mechanical reel 54 includes a rotary reel frame 54A that is rotatably coupled to the respective basket 60. A flexible semi-transparent or translucent reel strip (not shown) has a plurality of game symbols or indicia printed thereon. The reel strip is affixed to an outer perimeter of the rotary reel frame 54. A flexible printed circuit board 54B includes a plurality of light emitting diodes 54C mounted thereto to provide illumination to the reel strip. An electrical motor 54F is coupled between the basket 60 and the rotary reel frame 54A and is configured to controllably rotate the rotary reel frame 54. A reel controller 54D mounted to the basket 60 controls operation of the electric motor 54F to controllably rotate the mechanical reel 54. An electrical connecter 54E connects to the reel controller 54D to the game controller.

As discussed in further detail below, the basket(s) 60 allow the mechanical reels 54 to be adjustably mounted to a reel mounting member 56. The basket 60 is configured to allow for fast and easy installation of the reel device 52 (including the basket 60 and the associated mechanical reel 54).

As shown, each basket 60 includes a base 62, a side wall 64, a rear wall 66, and a locking tab 68. The mechanical reel 54 is mounted to the basket 60.

The base 62 includes first and second sides 62A, 62B, a front side 62C, and a rear side 62D. The side wall 64 is coupled to one of the first and second sides 62A, 62B of the base and extends in a first direction away from the base 62. In the illustrated embodiment, the first direction is upward in FIG. 5. Further, in the illustrated embodiment, the side wall 64 is configured to receive the mechanical reel 54 and to have the mechanical reel 54 to be mounted thereto.

The rear wall 66 is coupled to the rear side 62D of the base 62 and extends away from the base 62 in the first direction.

The base 62 includes a slot 72. The slot 72 includes a first end 72A and a second end 72B. The first end 72A of the slot 72 is located at the junction between the rear side 62D of the base 62 and the rear wall 66. The slot 72 extends from the first end 72A towards the front side 62C of the base 62 and terminates at the second end 72B. The slot 72A includes a tapered portion 72C located at the first end 72A and a slotted portion 72D. The tapered portion 72C has a first width ($width_1$), at the junction between the rear side 62D of the base 62 and the rear wall 66 and a second width ($width_1$) at a junction between the tapered portion 72C and the slotted portion 72D. The first width is greater than the second width. As described below, the slotted portion 72D assists in quickly and easily installing or positioning the basket 60 into the reel mounting member 56. In the illustrated embodiment, a width of the slotted portion 72D may be constant across the length of the slotted portion 72D. The width of the slotted portion 72D may be equal to the second width of the tapered portion 72C.

Figure 2:
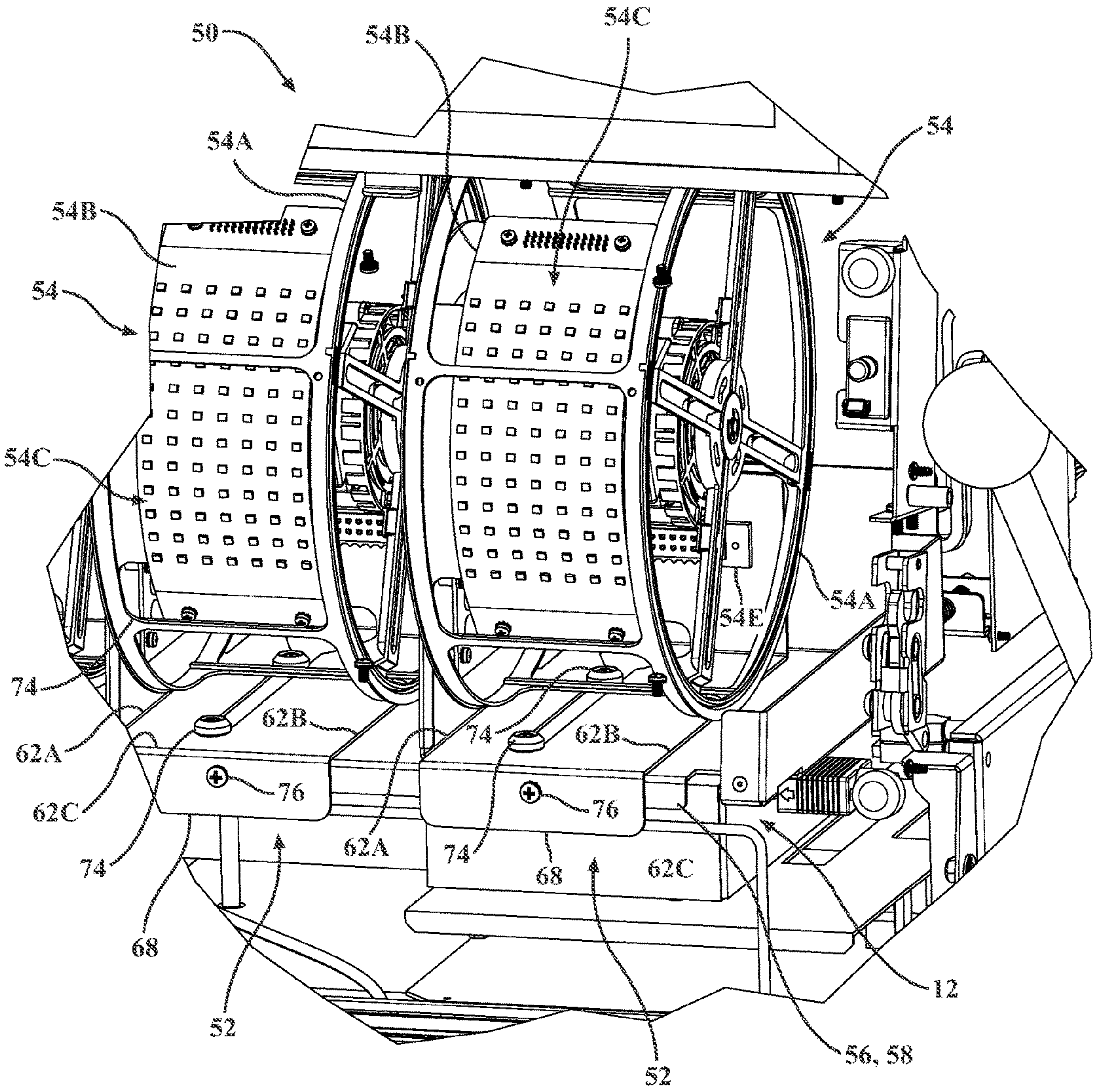
FIG. 2 is partial perspective view of a reel assembly having a plurality of reel devices and respective baskets for use with the gaming machine cabinet of FIG. 1, according to an embodiment of the present invention.
Figure 3:
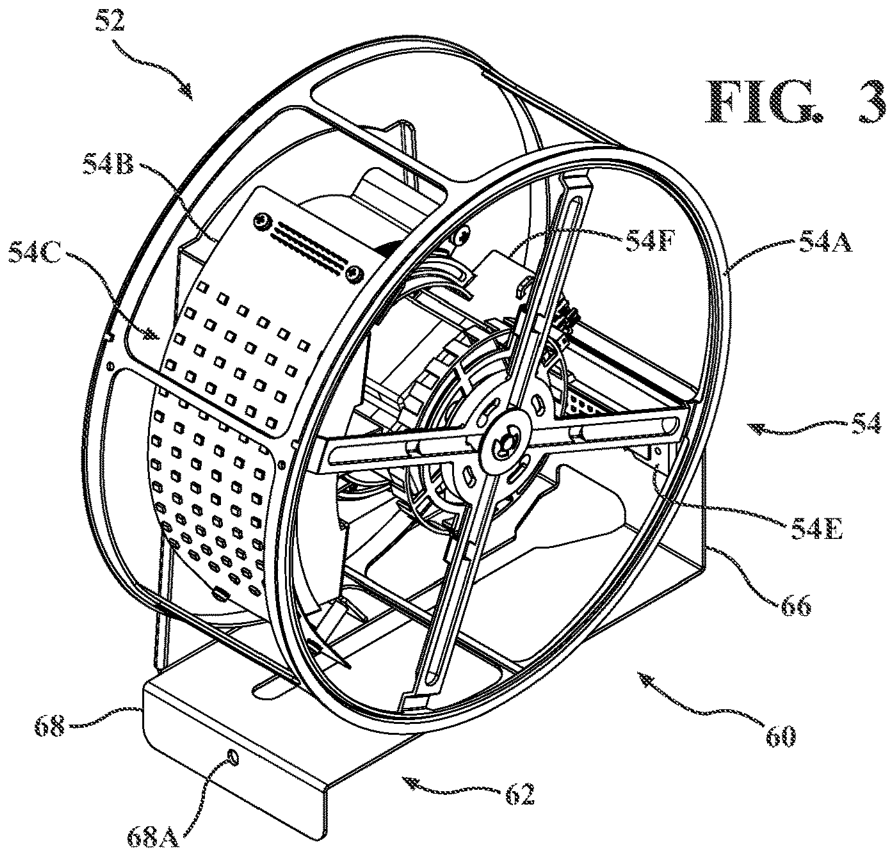
FIG. 3 is a first perspective view of a reel device having a mechanical reel and a respective basket, according to an embodiment of the present invention.
Figure 4:
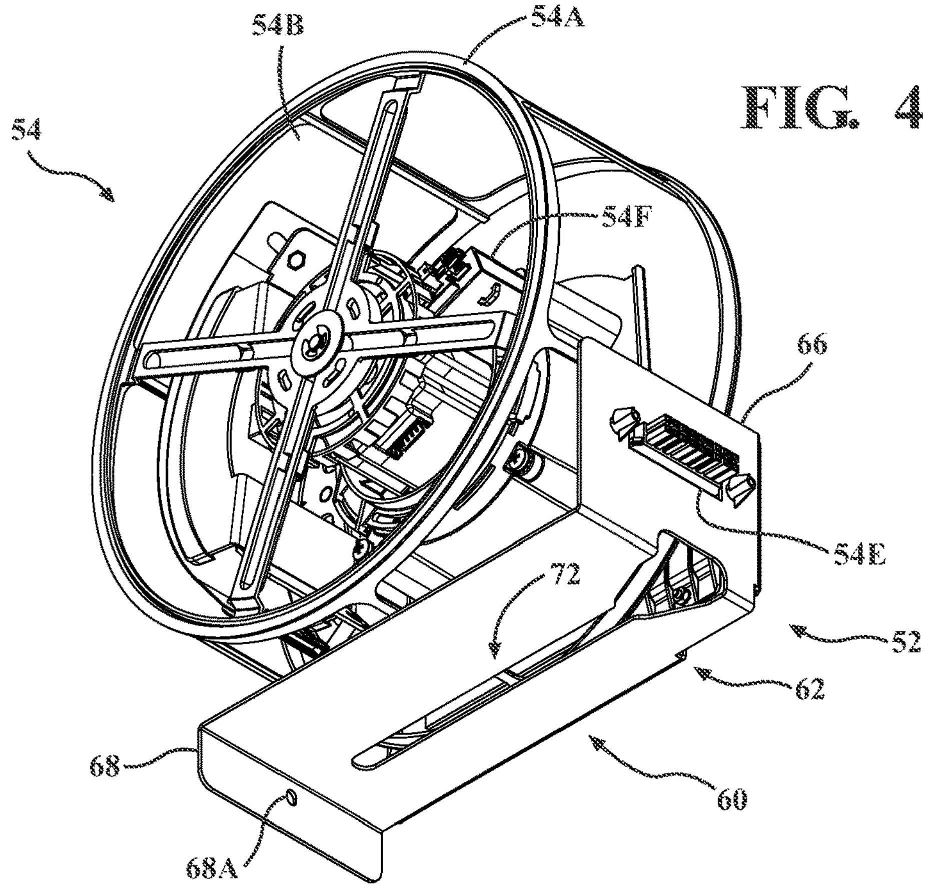
FIG. 4 is a second perspective view of the reel device of FIG. 3.
Figure 5:
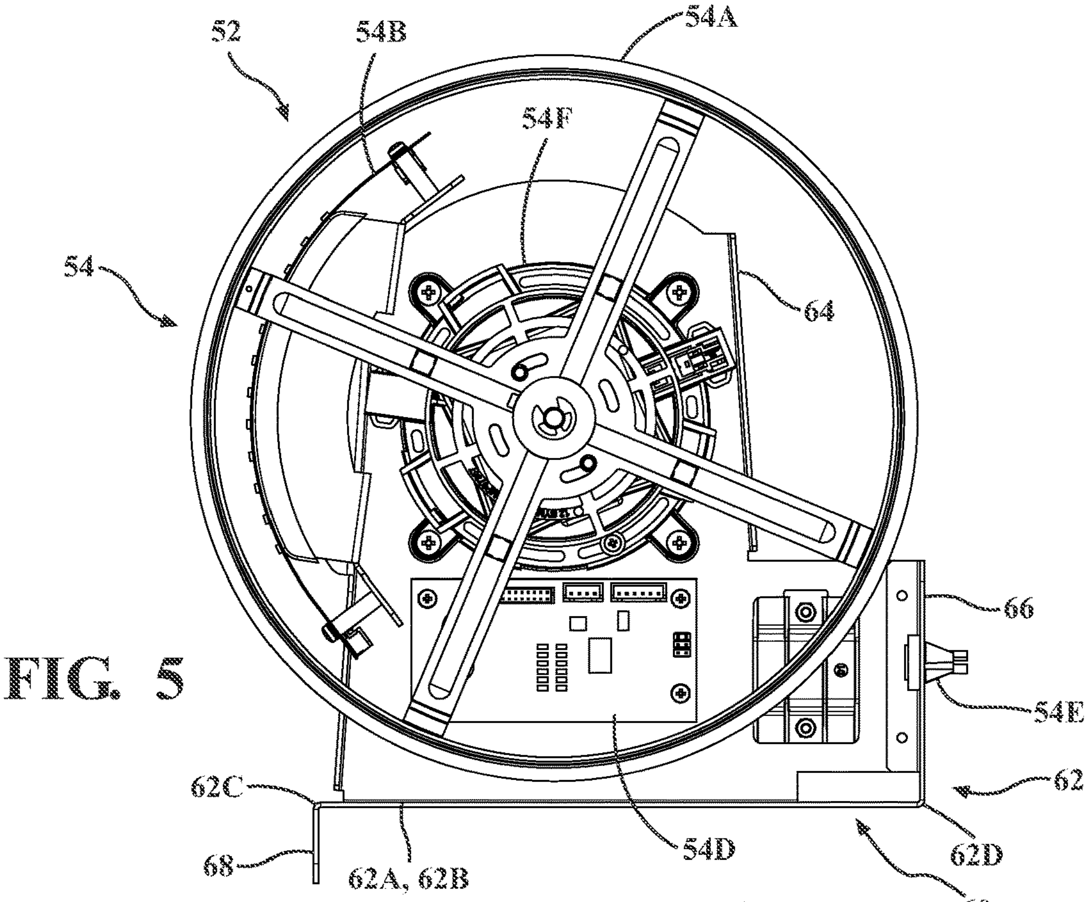
FIG. 5 is a side view of the reel device of FIG. 3
Figure 6:
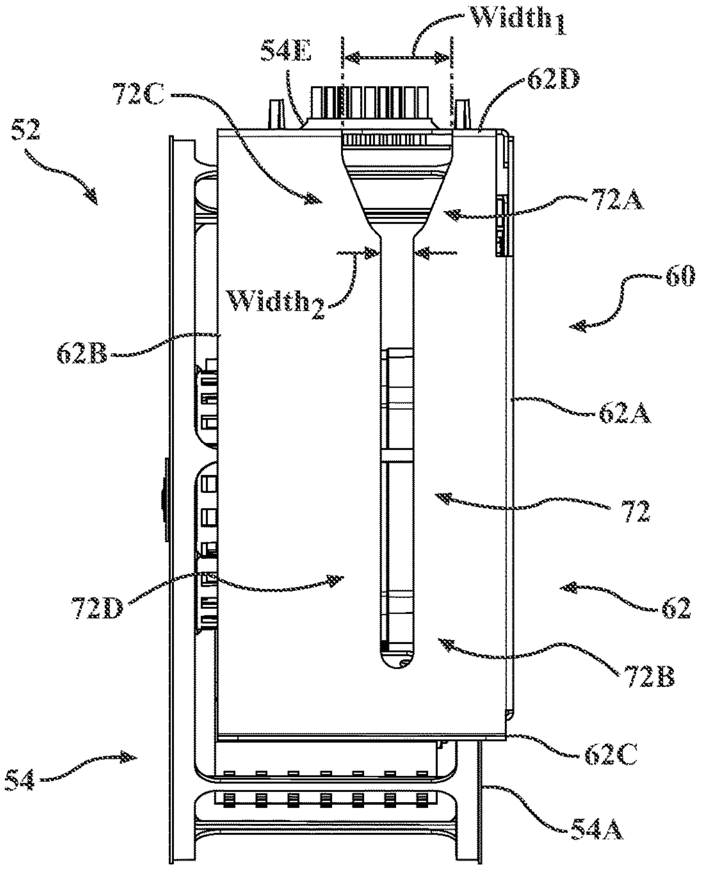
FIG. 6 is a bottom view of the reel device of FIG. 3.

The locking tab 68 is coupled to the front side 62C of the base 62 and extends away from the base 62 in a direction generally opposite the first direction. The locking tab 68 includes a fastener receiving aperture 68A. As shown in FIG. 2, a plurality of locating pins 74 may extend upward from the reel mounting member 56. The locating pins 74 may be fasteners such as screws or bolts connected to the reel mounting member 56. The tapered portion 72C of the slot 72 is configured to receive the one or more locating pins 74 fastened to the reel mounting member 56 and to allow the basket 60 and the reel device 52 to be correctly positioned relative to the reel mounting member 56 as the basket 60 is moved such that the one or more locating pins are positioned within the slotted portion of the slot. To install the reel device 52 on the reel mounting member 56, the basket 60 is positioned such that a front one of the locating pins 74 is positioned within the tapered portion 72C. The basket 60 may then be moved towards the back of the reel mounting member 56 such that the locating pins 72 are within the slotted portion 72D of the slot 72. When correctly positioned, the fastener receiving aperture 68A in the locking tab 68 is aligned with a corresponding aperture within the reel mounting member 56. A fastener 76 may then be used to fixedly couple the basket 60 to the reel mounting member 56.

Adjustable Sled

With specific reference to FIGS. 7-11, in a second aspect of the present invention, the reel assembly 50 includes the reel devices 52 and the reel mounting member 56 which is in the form of a reel mounting sled or sled 58. As discussed in more detail below, the reel mounting sled 58 is slidably mounted to a fixed reel framing member 70. The fixed reel framing member 70 is part of the gaming machine cabinet frame 14. The reel devices 52 are mounted to, or within, the reel mounting sled 58. As discussed in further detail below, the position of the reel mounting sled 58 relative to the gaming machine cabinet 12 or gaming machine cabinet frame 14 is self-adjustable. As discussed above, the plurality of reel devices 52 are mounted to the sled 58.

In the illustrated embodiment, the sled 58 includes a sled tray 78 and at least one spring mechanism 80. The sled tray 78 has a front side 78A and a rear side 78B and forms an inner tray cavity 78C. As stated above, the sled 58 forms the reel mount member 56 and the reel devices 52 are mounted within the inner tray cavity 78C. The front side 78A of the sled tray 78 forms at least one stop 78D. The sled tray 78 is slidably mounted to the fixed reel framing member 70. The at least one spring mechanism 80 has a first end 80A and a second end 80B. The first end 80A of the at least one spring mechanism 80 is coupled to the rear side 78B of the sled tray 78. The second end 80B of the at least one spring mechanism 80B is configured to be connected to the fixed reel framing member 70 to allow the sled tray 78 to be adjusted relative to the fixed reel framing member 70 in response to force being applied to the at least one stop 78D.

As shown, in the illustrated embodiment, reel assembly 50 includes three spring mechanisms 80. Each spring mechanism 80 includes a bracket 82, a threaded rod 84, and a spring 90. The bracket 82 is fastened to the fixed reel framing member 70 by a suitable fastener 88. The threaded rod 84 in inserted through apertures in the bracket 90 and an aperture in the rear side 78B of the sled tray 78. A nut 86 is threaded onto an end of the threaded rod 84.

Figure 7:
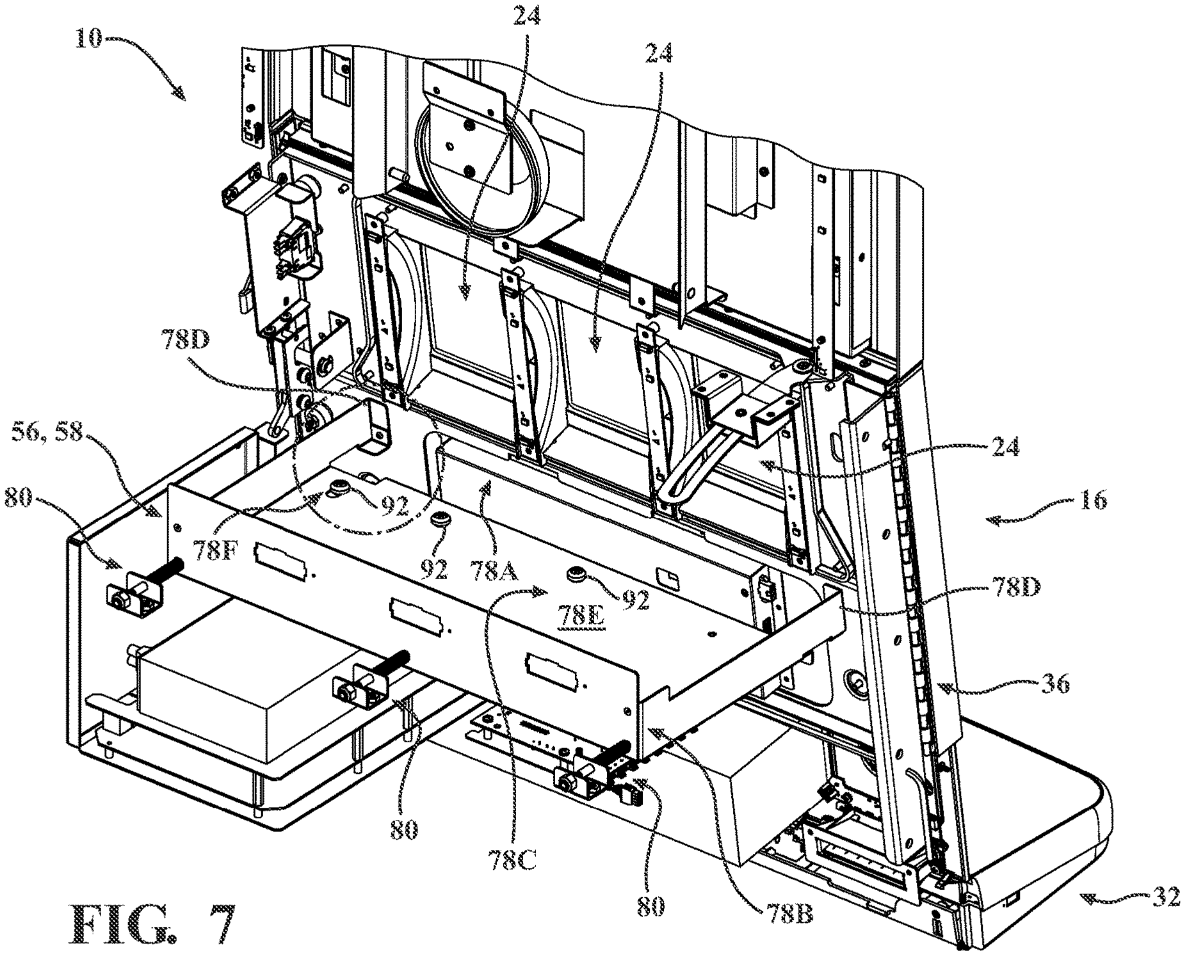
FIG. 7 is a perspective view of a reel mounting member within the gaming cabinet, according to an embodiment of the present invention.
Figure 8:
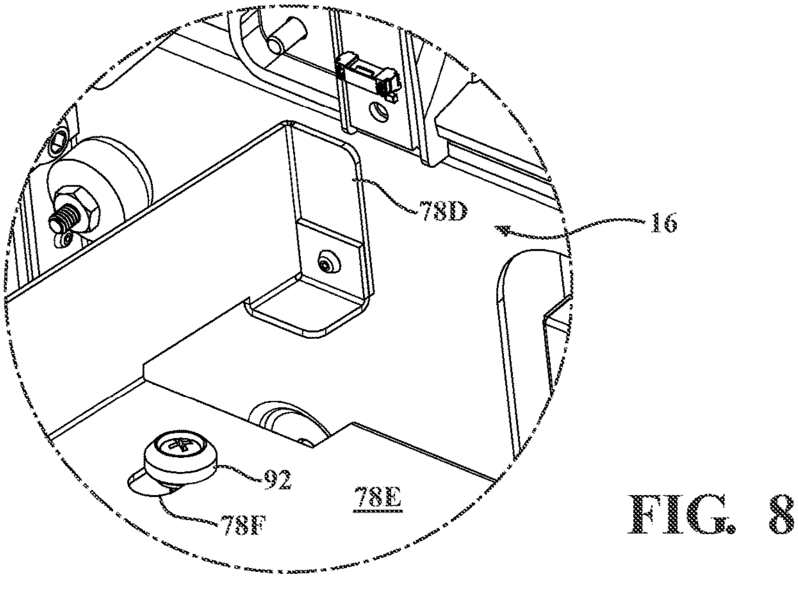
FIG. 8 partial view of the reel mounting member of FIG. 7.
Figure 9A:
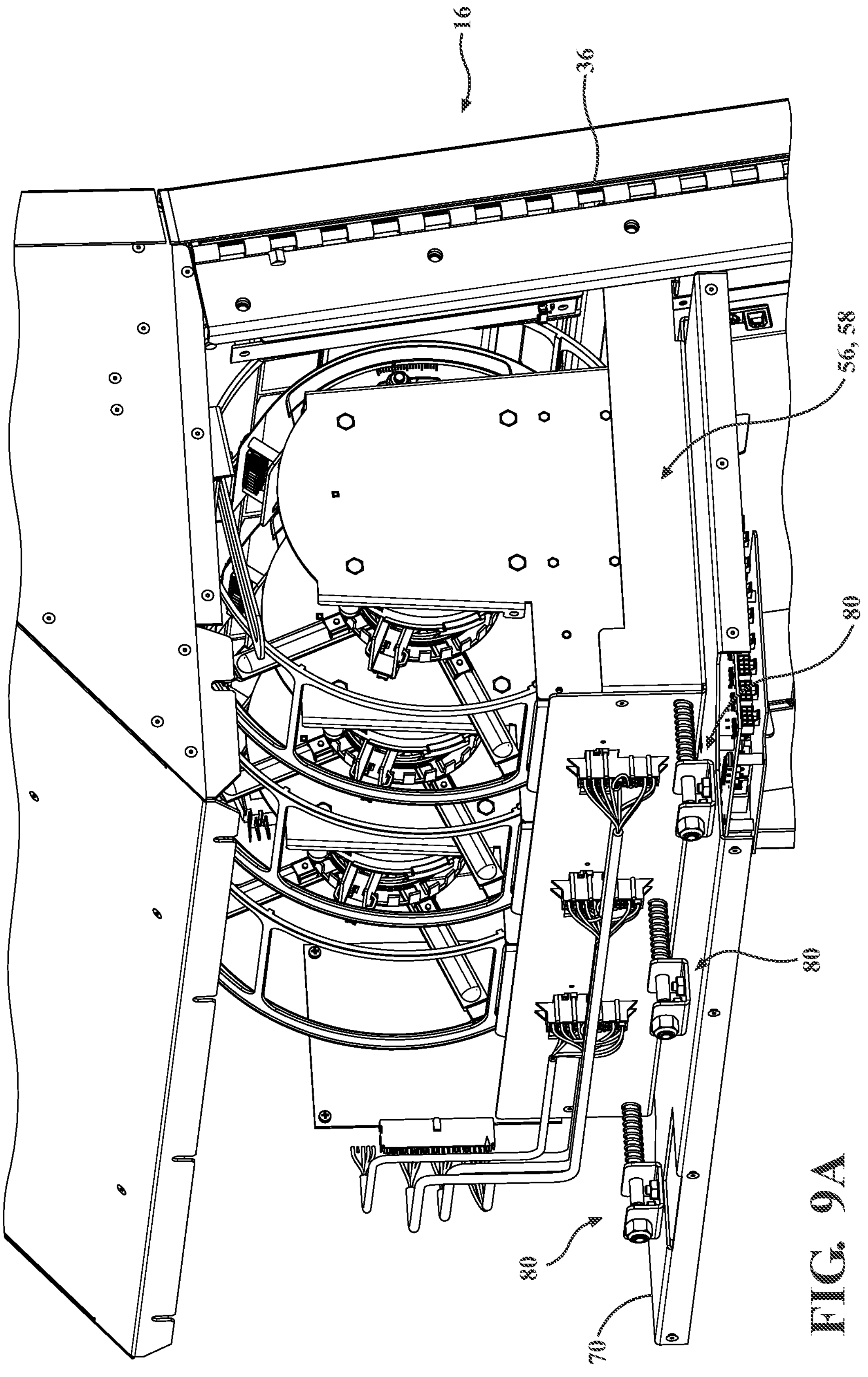
FIG. 9A is a perspective view of a reel assembly and a reel mounting member, shown as an adjustable sled, mounted in a gaming machine cabinet, according to an embodiment of the present invention.
Figure 9B:
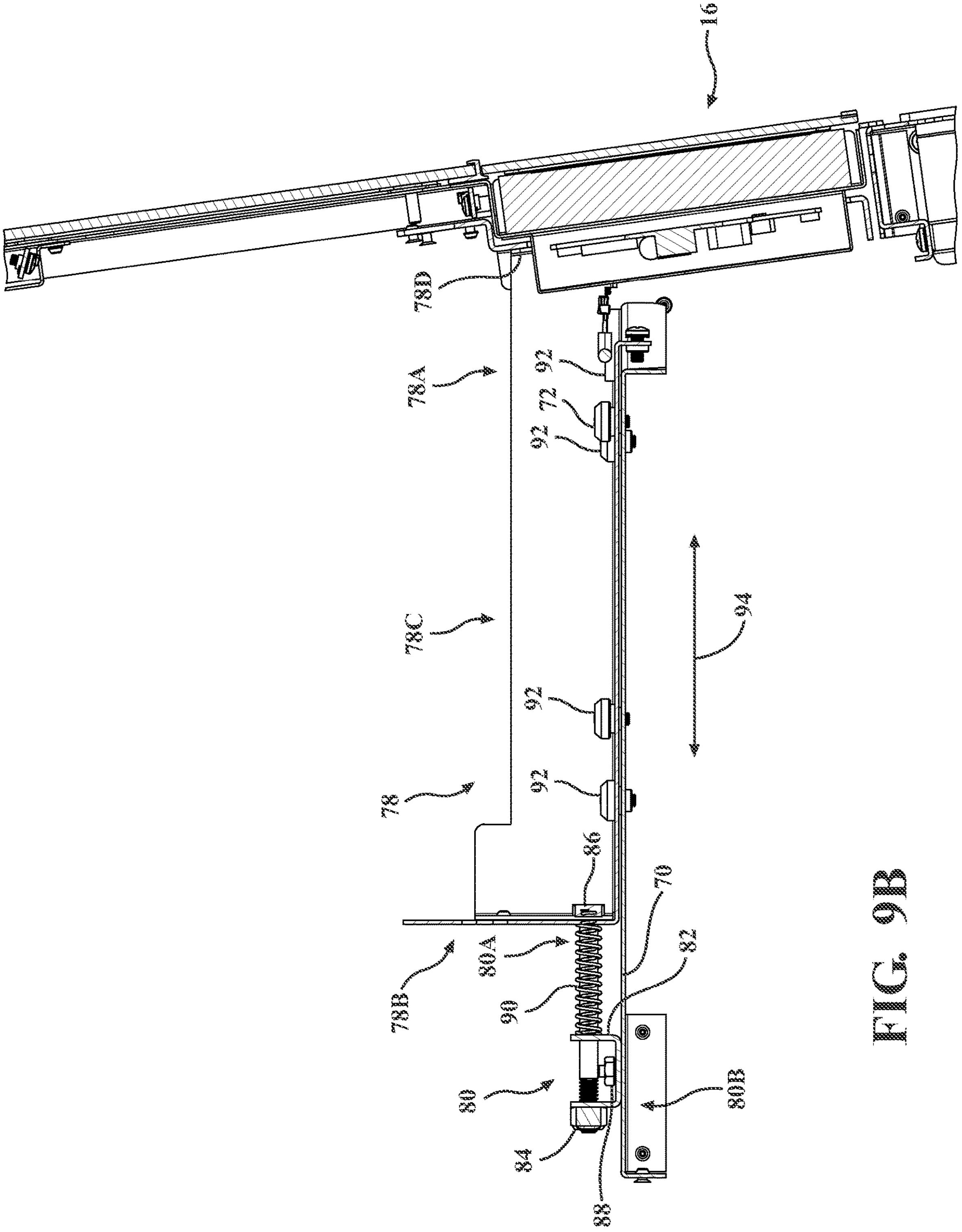
FIG. 9B, is a side view of the reel assembly and adjustable sled of FIG. 9A mounted in a gaming machine cabinet.
Figure 10:
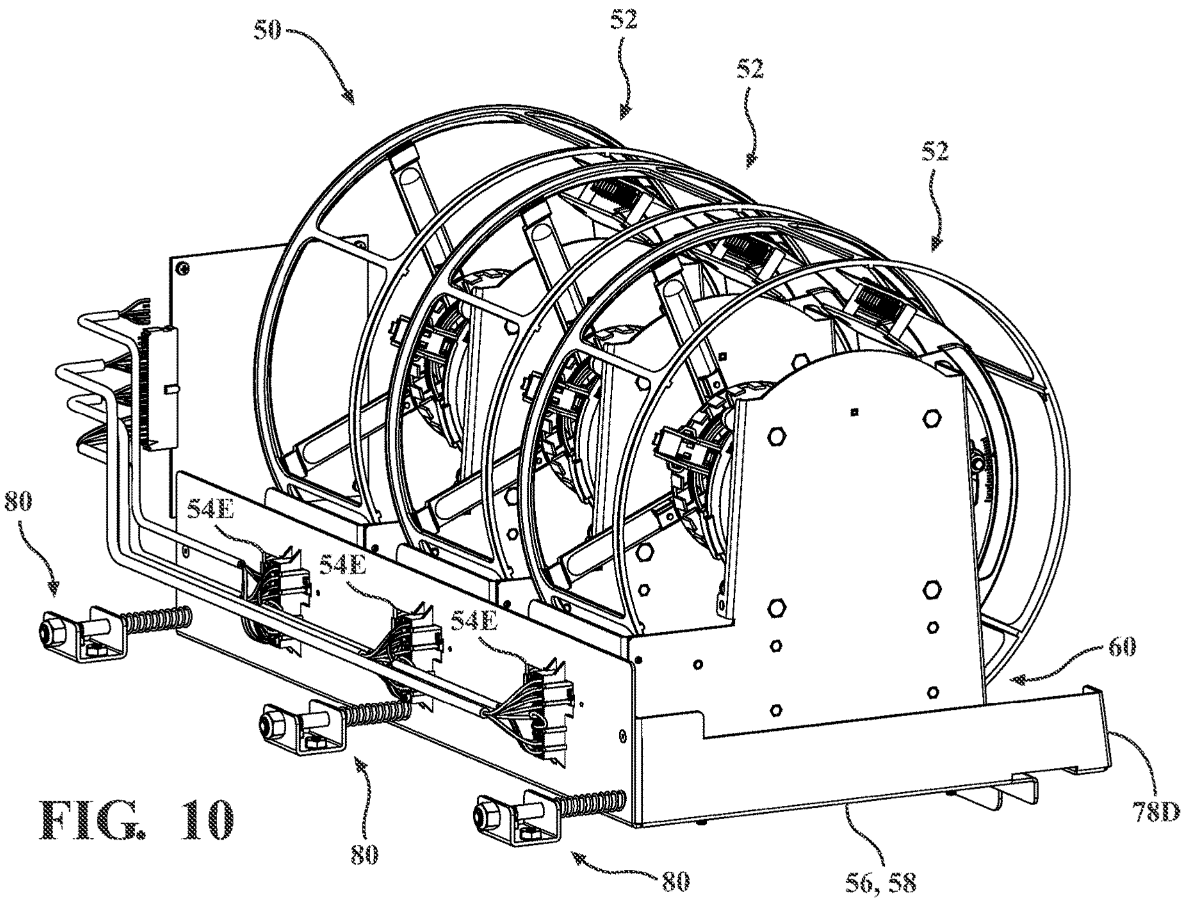
FIG. 10 is a perspective view of the reel assembly and adjustable sled of FIG. 9A.
Figure 11:
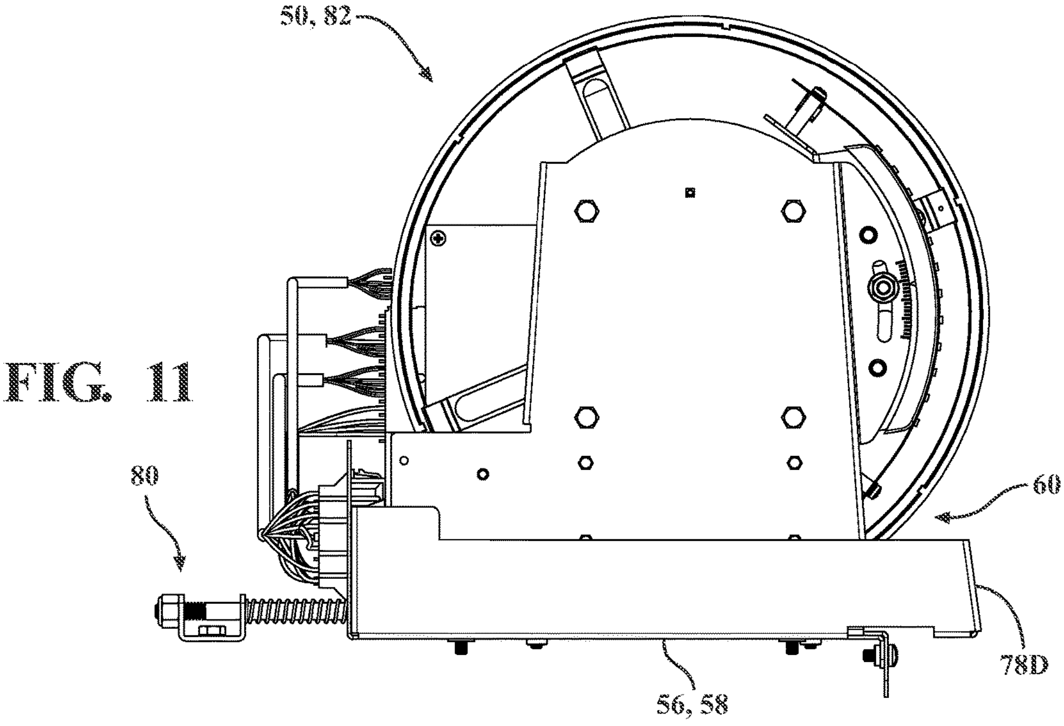
FIG. 11 is a side view of the reel assembly of FIG. 9A.

With specific reference to FIGS. 7, 8, and 9, a bottom surface 78E of the sled tray 78 has a plurality of elongated slots 78F. A threaded fastener 92 is inserted through each of the elongated slots 78F and into the fixed reel framing member 70. This arrangement allows the sled tray 78 to move in both directions in the direction of arrow 94 (see FIG. 9B). The spring 90 biases the sled tray 78 forward (to the right in FIG. 9B).

In the illustrated embodiment, the sled tray 78 includes a pair of stops 78D positioned at opposite ends of the front side 78A of the sled tray 78. When installed, the stops 78D abut a front surface of the inside of the gaming machine cabinet 12. The force exerted against the stops 78D by the front surface of the inside of the gaming machine cabinet pushes the sled tray 78 backward (to the left in FIG. 9B) such that the reel assembly 50 (and the mechanical reels 54) are positioned a desired from the windows 24 in the main unit 20.

In the illustrated embodiment, the main unit 20 includes an upper door 26. The windows 24 are within the upper door 26. The upper door 26 is rotatably coupled to the main unit 20 by an upper door hinge 36. In this embodiment, the stops 78D are configured against the inner surface of the upper door 26. The upper door 26 allows access to an upper cavity of the main unit 20. When the upper door 26 is closed, the inner surface of the upper door 26 pushes against the stops 78D to push or move the sled tray 78 into the desired position.

Belly Door Linkage Assembly

Figure 12:
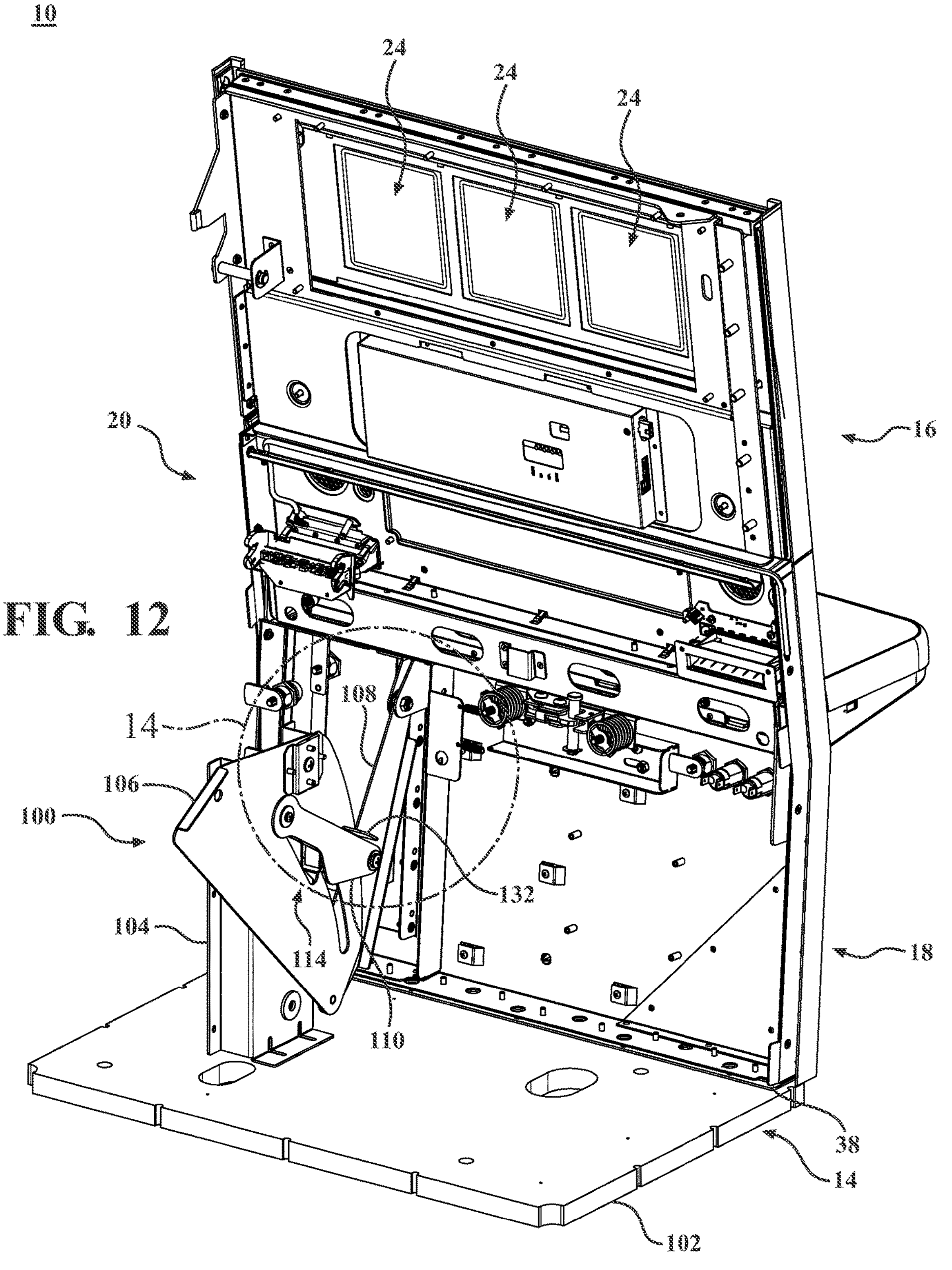
FIG. 12 is an interior perspective view of a portion of the gaming machine cabinet including a door linkage assembly associated with a belly door of a main unit of the gaming machine cabinet, according to an embodiment of the present invention.
Figure 13:
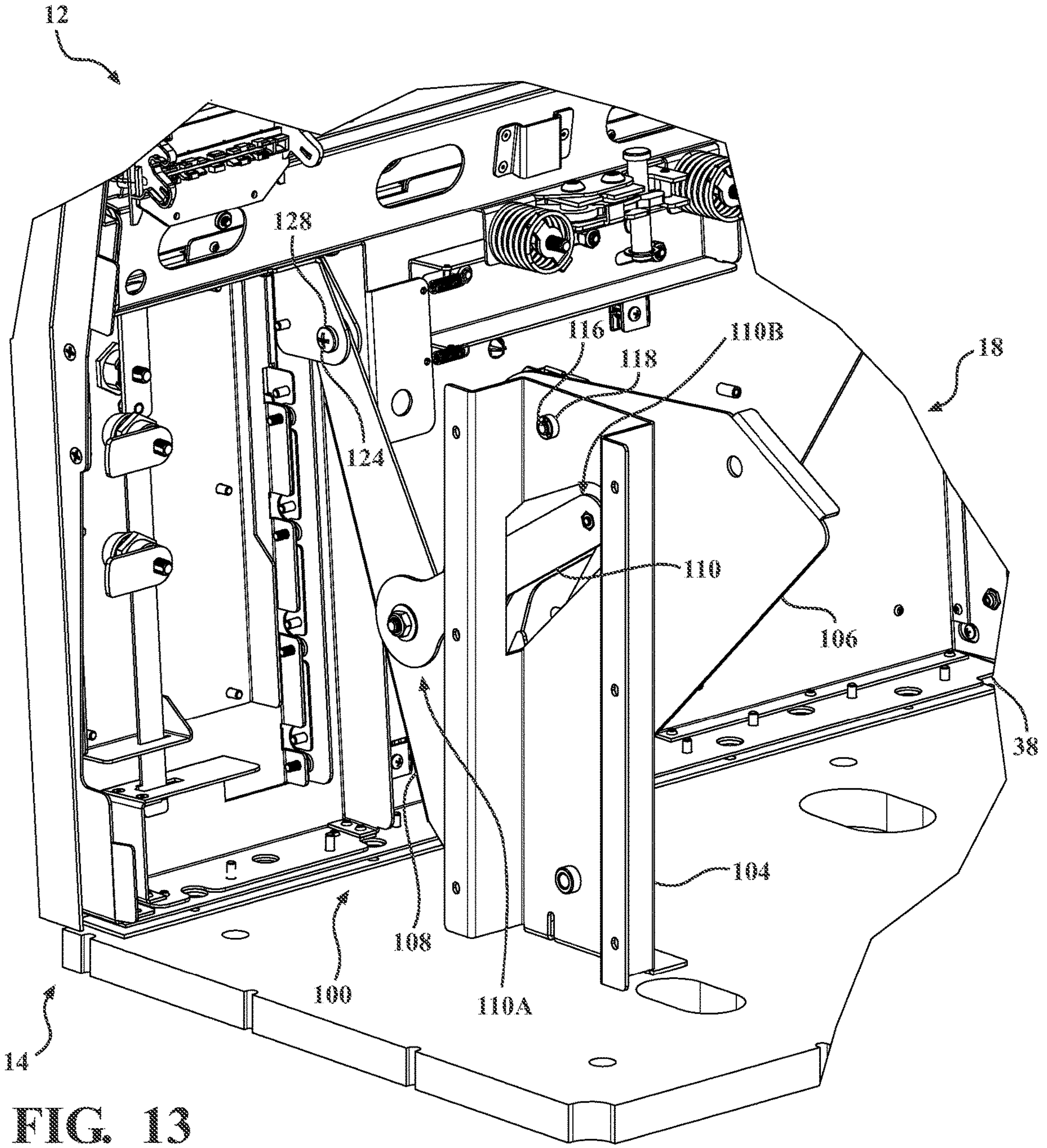
FIG. 13 is a first perspective view of a portion of the door linkage assembly of FIG. 12 within a gaming machine cabinet
Figure 14:
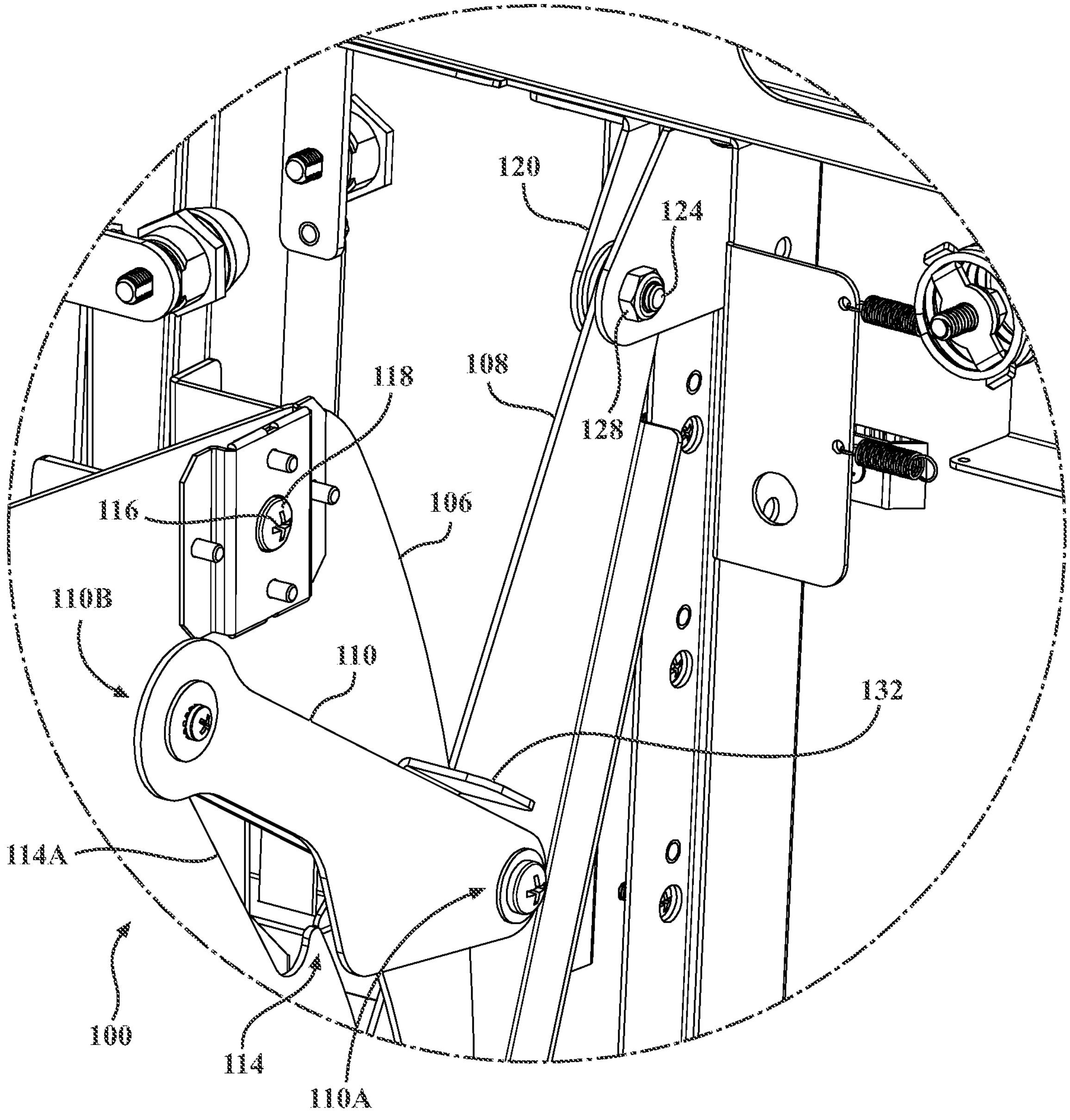
FIG. 14 is a second perspective view of a portion of the door linkage assembly of FIG. 12.
Figure 15:
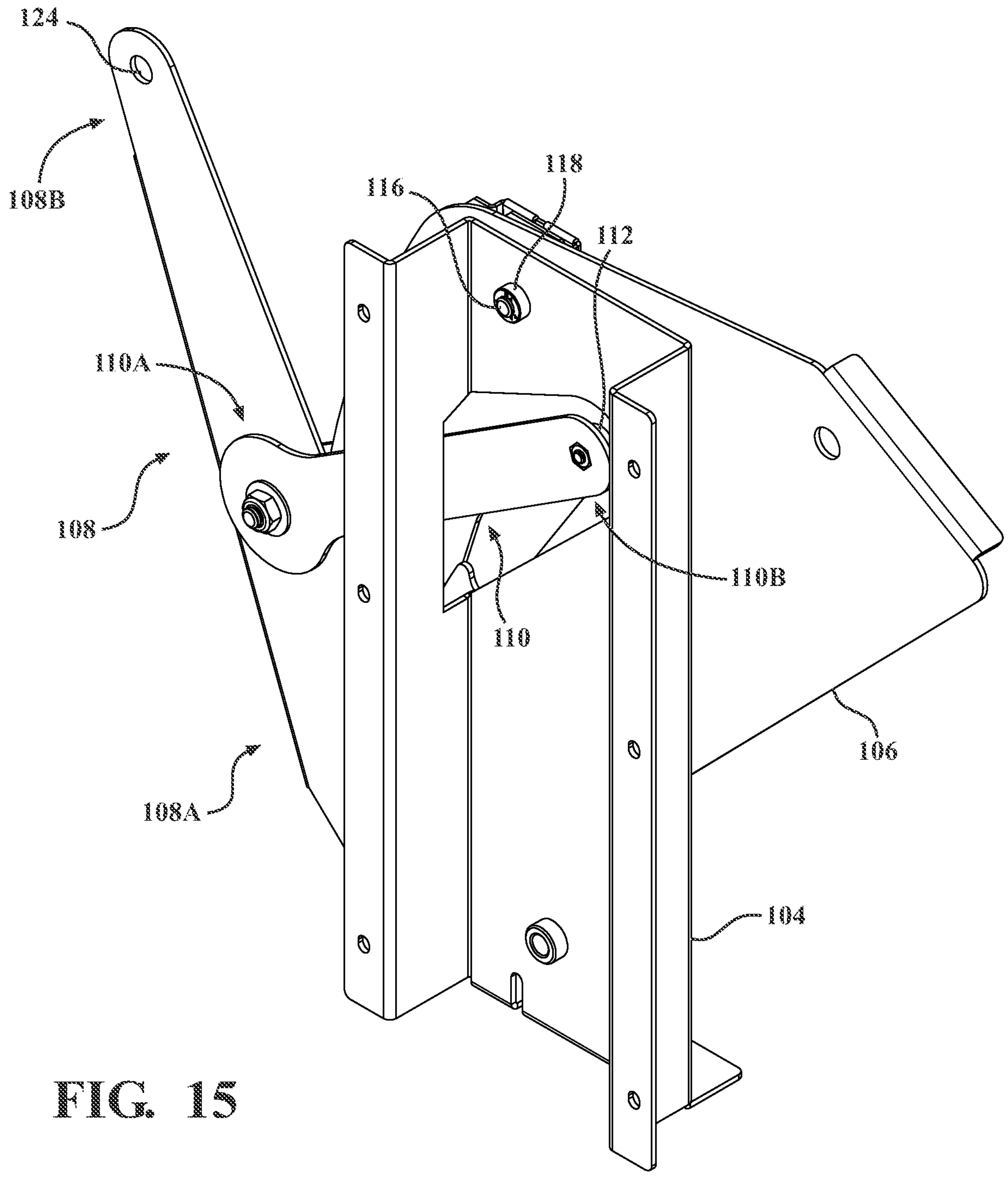
FIG. 15 is a first perspective view of the door linkage assembly of FIG. 12 in a closed position.
Figure 16:
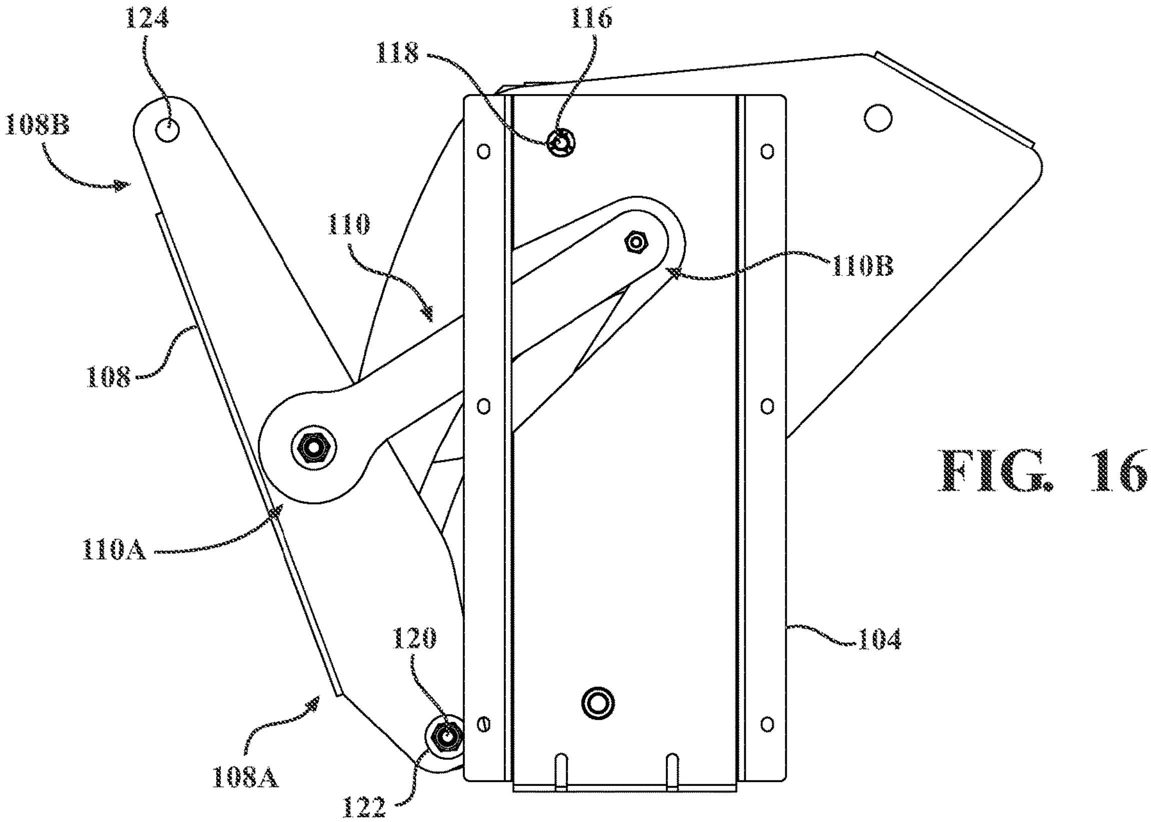
FIG. 16 is a first side view of the door linkage assembly of FIG. 12 in the closed position.
Figure 17:
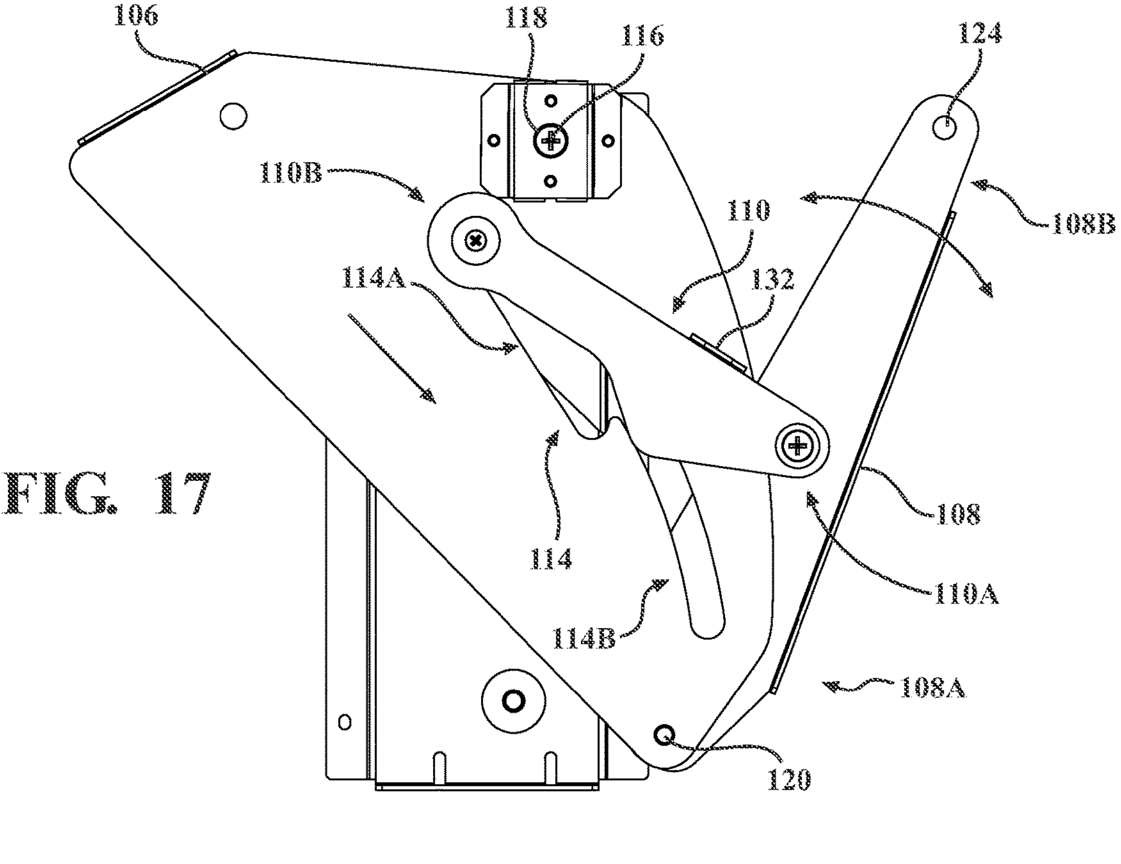
FIG. 17 is a second side view of the door linkage assembly of FIG. 12 in the closed position.
Figure 18:
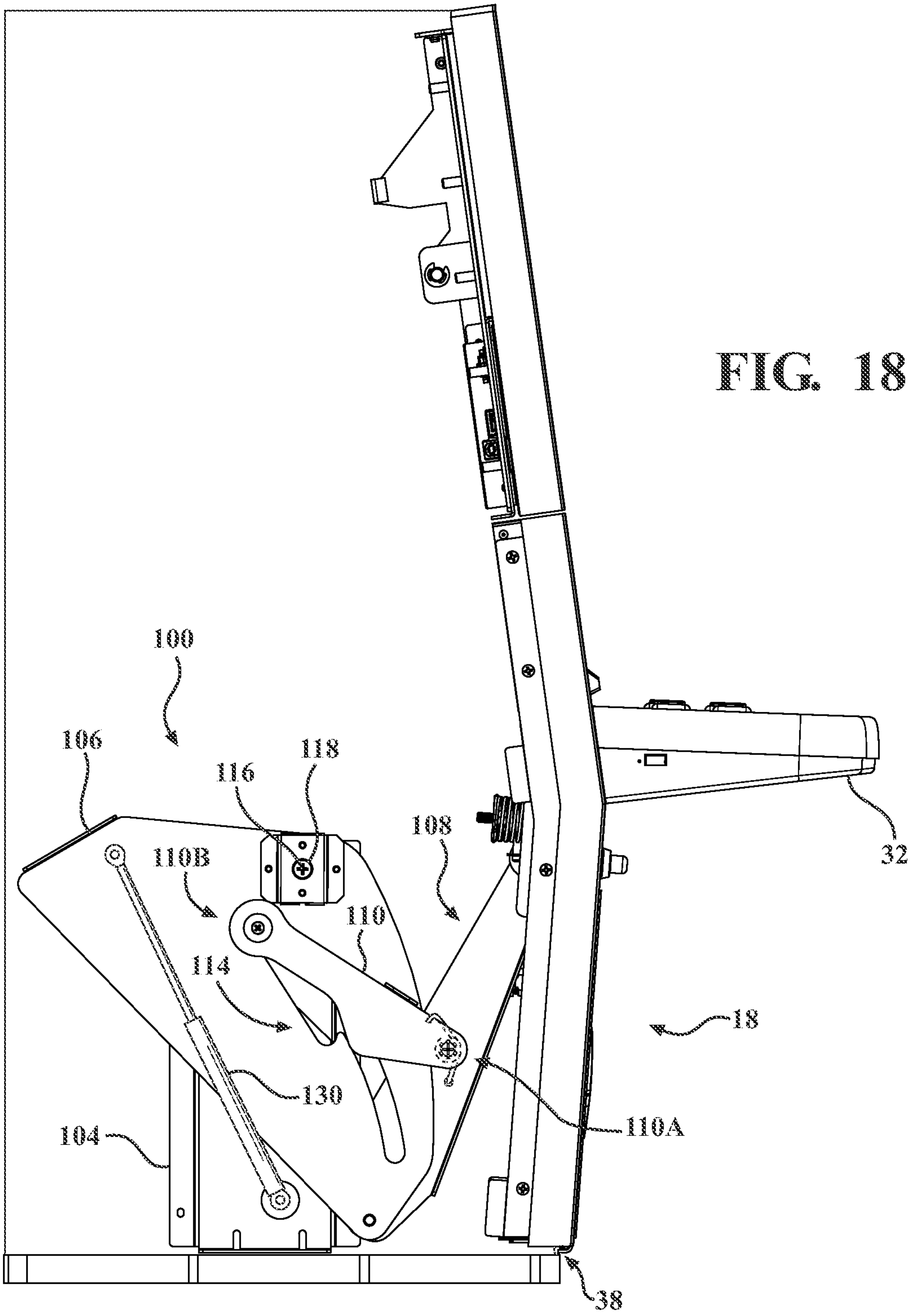
FIG. 18 is a side view of the door linkage assembly FIG. 12 and the belly door of the gaming machine cabinet in the closed position.
Figure 19:
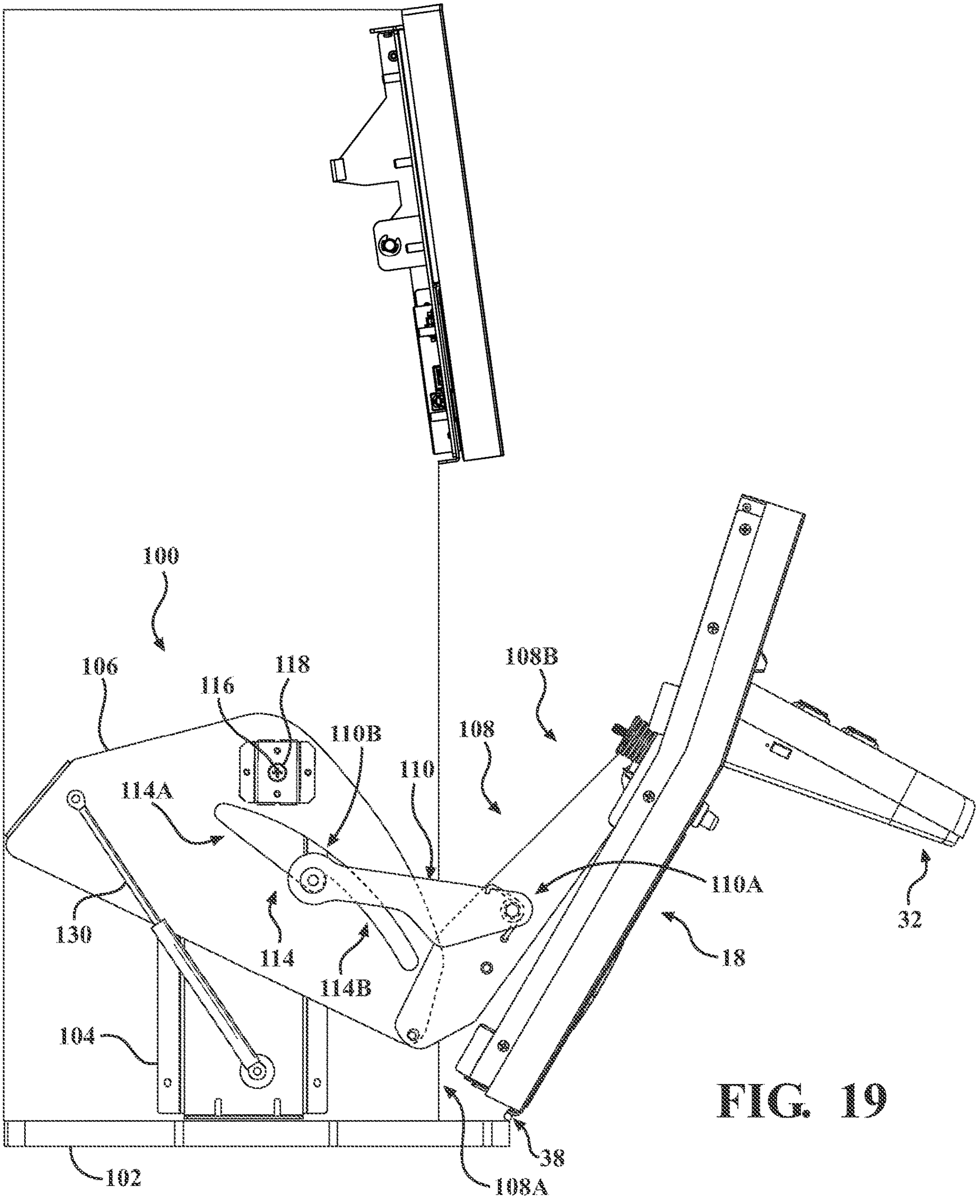
FIG. 19 is side view of the door linkage assembly FIG. 12 and the belly door of the gaming machine cabinet in an intermediate position.
Figure 20:
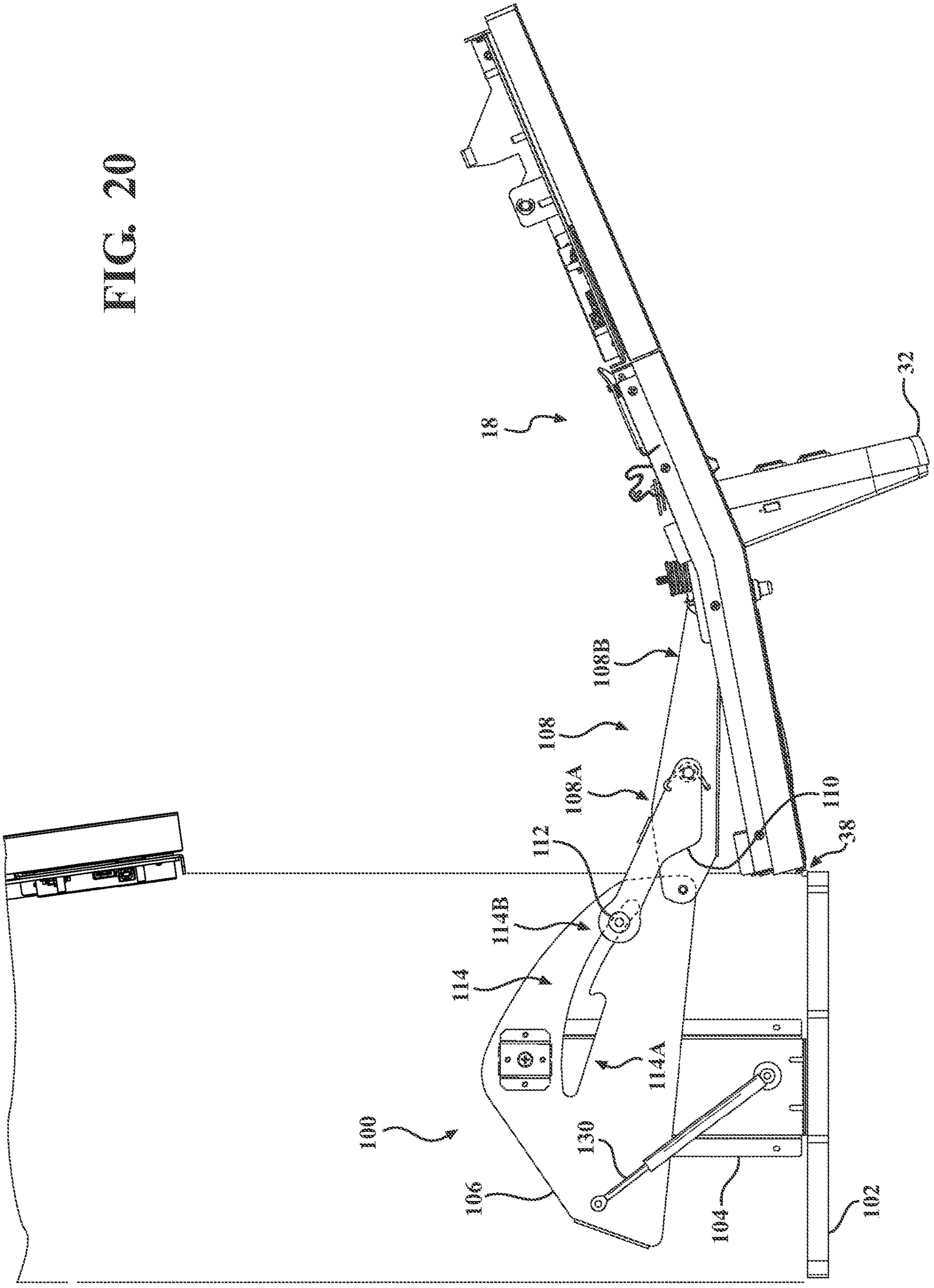
FIG. 20 is a side view of the door linkage assembly FIG. 12 and the belly door of the gaming machine cabinet in a fully opened position.

With reference to FIGS. 12-20, in another aspect of the present invention, a linkage mechanism 100 for a door 16, 18 in a gaming machine cabinet 12. In the illustrated embodiment, the linkage mechanism 100 is used with the lower or belly door 18. With particular reference to FIG. 12, the gaming machine cabinet 12 includes a gaming machine cabinet frame 14. The gaming machine cabinet frame 14 includes a floor member 102. The linkage mechanism 100 is coupled between the floor member 102 and the belly door 18. In the illustrated embodiment, a lower edge of the belly door 18 is rotatably coupled to the floor member 102 by a belly door hinge 38. As shown in FIGS. 18, 19, and 20, the linkage mechanism 100 is configured to allow the belly door 18 to be moveable between a closed position (FIG. 18), an intermediate position (FIG. 19), and a fully open position (FIG. 20). The belly door 18 may be configured with a lock (not shown) to controllably control or prevent access to the interior of the gaming machine cabinet 12.

When the lock is unlocked, the belly door 18 may be moved from the closed position to the intermediate position. The linkage mechanism 100 has a locked configuration and an unlocked configuration. In the locked configuration, the linkage mechanism 100 prevents further movement of the belly door 18 from the intermediate position. The linkage mechanism 100 may be moved from the locked configuration to the unlocked configuration. Once in the unlocked configuration, the linkage mechanism 100 allows the belly door 18 to be moved from the intermediate position to the fully open position.

When the belly door 18 is in the intermediate position, some access to the interior of the main unit 20 may be provided. Certain operations, such as maintenance operations, may be performed while the belly door 18 is in the intermediate position. However, some operations may require the belly door 18 to be in the fully open position.

In the illustrated embodiment, the linkage mechanism 100 includes an upright frame member 104, a bracket 106, an arm 108, a first linking member 110, and a pin 112. The upright frame member 104 may be mounted to the floor member 102 by a plurality of fasteners. As shown, the upright frame member 104 that extends upward from the floor member 102.

The bracket 106 is rotatably coupled to the upright frame member 104 at a first pivot point 116 and includes a slot 114. In the illustrated embodiment, the slot 114 includes a first guiding portion 114A, a second guiding portion 114B, and a locking portion 114C. The locking portion 114C is located between the first and second guiding portions 114A, 114B. The bracket 106 is rotatably coupled to the upright frame member 104 by a fastener 118.

The arm 108 includes a first arm end 108A and a second arm end 108B. The first arm end 108A is rotatably coupled to the bracket 106 at a second pivot point 120 by a fastener 122. The second arm end 108B is rotatably coupled to a rear of the belly door 18 at a third pivot point 124. In the illustrated embodiment, the third pivot point 124 is defined by a door bracket 126 mounted to the rear of the belly door 18 (see FIG. 13). The arm 108 is coupled to the door bracket 126 by a fastener 128.

The linking member 110 has a first linking member end 110A and a second linking member end 110B. The first linking member end 110A is rotatably coupled to the arm 108. The linking member 110 is moveable between a locked position (corresponding to the locked configuration of the linkage mechanism) and an unlocked position (corresponding to the unlocked configuration of the linkage mechanism). The pin 112 is fastened to the second linking member end 110B and is slidably located within the slot 114 of the bracket 106. The pin 112 is at one end of the first guiding portion 114A (see FIGS. 15, 16, 17, and 18) when the door in is the closed position.

As the belly door 18 is moved from the closed position to the intermediate position, the arm 108 rotates about the second pivot point 124 and the bracket 106 pivots about the first pivot point 116. In addition, the pin 112 moves along the first guiding portion 114A of the slot 114 towards the locking portion 114C. Motion of the belly door 18 is defined or limited by the belly door hinge 38, pin 112 within the first guiding portion 114A of the slot 114. In the illustrated embodiment, gravity acts on the arm 108 to bias the arm 108 and the pin 112 downward. As shown, the locking portion 114C is in shape of a well that retains the pin 112 until the pin 112 is manually lifted from the locking portion 114C into the unlocked position. As the pin moves within the first guiding portion of the slot 114 towards the locking portion 114C as the door 18 is moved from the closed position towards the intermediate position. The pin 112 is positioned within the locking portion 114C of the slot 114 thereby preventing movement of the belly door 18 when the belly door 18 is in the intermediate position and the linking member 110 is in the locked position.

In the illustrated embodiment, a lift tab 68 on the linking member 110 facilitates lifting of the linking member 110 from the locked to the unlocked positions thereby moving the pin 112 out of the locking portion 114C of the slot 114.

Once the pin 112 is out of the locking portion 114C of the slot 114, the belly door 18 may be moved from the intermediate position (see FIG. 19) to the fully open position (See FIG. 20). A gas assist cylinder 130 coupled between upright frame member 104 and the bracket 106 to reduce the amount of force required to open and close the belly door 18.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A linkage mechanism for a door in a gaming machine cabinet, the gaming machine cabinet having a floor member, a lower edge of the door being rotatably coupled to the floor member by a hinge, comprising:

an upright frame member mounted to the floor member and extending therefrom;

a bracket rotatably coupled to the upright frame member and having a slot, the slot including first and second guiding portions forming a locking portion at a junction between the first guiding portion and the second guiding portion;

an arm having a first arm end and second arm end, the first arm end being rotatably coupled to the bracket, the second arm end being rotatably coupled to a rear of the door;

a linking member having a first linking member end and a second linking member end, the first linking member end being rotatably coupled to the arm, the linking member being moveable between a locked position and an unlocked position; and, a pin fastened to the second linking member end and being slidably located within the slot of the bracket, the linkage mechanism being configured to allow the door to be moved between a closed position and an intermediate position, the pin being at one end of the first guiding portions when the door in is the closed position, wherein the pin moves within the first guiding portion of the slot towards the locking portion as the door is moved from the closed position towards the intermediate position, wherein the pin is positioned within the locking portion of the slot thereby preventing movement of the door when the door is in the intermediate position and the linking member is in the locked position, wherein the pin is moved from the locking portion of the slot when the linking member is moved from the locked position to the unlocked position thereby allowing the door to be opened past the intermediate position towards a fully opened position.

2. The linkage mechanism, as set forth in claim 1, wherein the linking member includes a lift tab configured to facilitate lifting the linking member from the locked position to the unlocked position.

3. The linkage mechanism, as set forth in claim 1, further comprising a door bracket mounted to the door, the second arm end of the arm being rotatably coupled to the door bracket.

4. The linkage mechanism, as set forth in claim 1, wherein the linkage mechanism has a locked configuration defined by the pin being located with the locking portion of the slot and an unlocked configuration.

5. A door assembly for a gaming machine cabinet having a floor member, comprising:

a door having a lower edge rotatably coupled to the floor member by a hinge; and, a linkage mechanism coupled between the door and the cabinet, the linking mechanism including:

an upright frame member mounted to the floor member and extending therefrom;

a bracket rotatably coupled to the upright frame member having a slot, the slot including first and second guiding portions, the first and second guiding portions forming a locking portion at a junction between the first and second guiding portions;

an arm having a first arm end and second arm end, the first arm end being rotatably coupled to the bracket, the second arm end being rotatably coupled to a rear of the door;

a linking member having a first linking member end and a second linking member end, the first linking member end being rotatably coupled to the arm, the linking member being moveable between a locked position and an unlocked position; and, a pin fastened to the second linking member end and being slidably located within the slot of the bracket, the linkage mechanism being configured to allow the door to be moved between a closed position and an intermediate position, the pin being at one end of the first guiding portions when the door in is the closed position, wherein the pin moves within the first guiding portion of the slot towards the locking portion as the door is moved from the closed position towards the intermediate position, wherein the pin is positioned within the locking portion of the slot thereby preventing movement of the door when the door is in the intermediate position and the linking member is in the locked position, wherein the pin is moved from the locking portion of the slot when the linking member is moved from the locked position to the unlocked position thereby allowing the door to be opened past the intermediate position towards a fully opened position.

6. The door assembly, as set forth in claim 5, wherein the linking member includes a locking tab configured to facilitate lifting the linking member from the locked position to the unlocked position.

7. The door assembly, as set forth in claim 5, further comprising a door bracket mounted to a rear of the door, the second arm end of the arm being rotatably coupled to the door bracket.

8. The door assembly, as set forth in claim 5, wherein the linkage mechanism has a locked configuration defined by the pin being located with the locking portion of the slot and an unlocked configuration.

9. A gaming machine cabinet, comprising:

a frame having a floor member;

a door having a lower edge rotatably coupled to the floor member by a hinge; and, a linkage mechanism coupled between the door and the cabinet, the linking mechanism including:

an upright frame member mounted to the floor member and extending therefrom;

a bracket rotatably coupled to the upright frame member having a slot, the slot including first and second guiding portions, the first and second guiding portions forming a locking portion at a junction between the first and second guiding portions;

an arm having a first arm end and second arm end, the first arm end being rotatably coupled to the bracket, the second arm end being rotatably coupled to a rear of the door;

a linking member having a first linking member end and a second linking member end, the first linking member end being rotatably coupled to the arm, the linking member being moveable between a locked position and an unlocked position; and, a pin fastened to the second linking member end and being slidably located within the slot of the bracket, the linkage mechanism being configured to allow the door to be moved between a closed position and an intermediate position, the pin being at one end of the first guiding portions when the door in is the closed position, wherein the pin moves within the first guiding portion of the slot towards the locking portion as the door is moved from the closed position towards the intermediate position, wherein the pin is positioned within the locking portion of the slot thereby preventing movement of the door when the door is in the intermediate position and the linking member is in the locked position, wherein the pin is moved from the locking portion of the slot when the linking member is moved from the locked position to the unlocked position thereby allowing the door to be opened past the intermediate position towards a fully opened position.

10. The gaming machine cabinet, as set forth in claim 9, wherein the linking member includes a locking tab configured to facilitate lifting the linking member from the locked position to the unlocked position.

11. The gaming machine cabinet, as set forth in claim 9, further comprising a door bracket mounted to a rear of the door, the second arm end of the arm being rotatably coupled to the door bracket.

12. The gaming machine cabinet, as set forth in claim 9, wherein the linkage mechanism has a locked configuration defined by the pin being located with the locking portion of the slot and an unlocked configuration.

* * * * *